US011862840B2

(12) United States Patent
Taylor et al.

(10) Patent No.: US 11,862,840 B2
(45) Date of Patent: Jan. 2, 2024

(54) COMPACT STORABLE EXTENDIBLE MEMBER REFLECTOR

(71) Applicant: Eagle Technology, LLC, Melbourne, FL (US)

(72) Inventors: Robert M. Taylor, Rockledge, FL (US); Philip J. Henderson, Palm Bay, FL (US)

(73) Assignee: EAGLE TECHNOLOGIES, LLC, Melbourne, FL (US)

( * ) Notice: Subject to any disclaimer, the term of this patent is extended or adjusted under 35 U.S.C. 154(b) by 199 days.

(21) Appl. No.: 17/411,865

(22) Filed: Aug. 25, 2021

(65) Prior Publication Data

US 2021/0384607 A1 Dec. 9, 2021

Related U.S. Application Data

(62) Division of application No. 16/249,083, filed on Jan. 16, 2019, now Pat. No. 11,139,549.

(51) Int. Cl.
*H01Q 1/28* (2006.01)
*H01Q 15/16* (2006.01)
(Continued)

(52) U.S. Cl.
CPC ........... *H01Q 1/1235* (2013.01); *H01Q 1/288* (2013.01); *H01Q 15/14* (2013.01); *H01Q 15/161* (2013.01)

(58) Field of Classification Search
CPC .......... H01Q 1/08; H01Q 1/12; H01Q 1/1235; H01Q 1/288; H01Q 15/14; H01Q 15/161
See application file for complete search history.

(56) References Cited

U.S. PATENT DOCUMENTS 2,806,134 A 9/1957 Tarcici
3,064,534 A 11/1962 Tumavicus
(Continued)

FOREIGN PATENT DOCUMENTS

CN 108417991 A 8/2018
WO 2014068342 A1 5/2014

OTHER PUBLICATIONS

Kovitz, J.M., et al., "A spline profiled conical horn antenna assembly optimized for deployable Ka-band offset reflector antennas in CubeSats," Published 2016 in IEEE International Symposium on Antennas; AP-S 2016; 978-1-5090-2886-3/16.
(Continued)

*Primary Examiner* — Ab Salam Alkassim, Jr.
*Assistant Examiner* — Leah Rosenberg
(74) *Attorney, Agent, or Firm* — Fox Rothschild LLP; Carol Thorstad-Forsyth

(57) ABSTRACT

Perimeter truss reflector includes a perimeter truss assembly (PTA) comprised of a plurality of battens, each having an length which traverses a PTA thickness as defined along a direction aligned with a reflector central axis. A collapsible mesh reflector surface is secured to the PTA such that when the PTA is in a collapsed configuration, the reflector surface is collapsed for compact stowage and when the PTA is in the expanded configuration, the reflector surface is expanded to a shape that is configured to concentrate RF energy in a predetermined pattern. Each of the one or more longerons extend around at least a portion of a periphery of the PTA. These longerons each comprise a storable extendible member (SEM) which can be flattened and rolled around a spool, but exhibits beam-like structural characteristics when unspooled.

10 Claims, 16 Drawing Sheets

(51) Int. Cl.
*H01Q 1/12* (2006.01)
*H01Q 15/14* (2006.01)

(56) References Cited

U.S. PATENT DOCUMENTS

| | | | |
|---|---|---|---|
| 3,165,751 A | 1/1965 | Clark | |
| 3,176,397 A | 4/1965 | Schuhmann | |
| 3,179,211 A | 4/1965 | Dunlavy | |
| 3,217,328 A | 11/1965 | Miller | |
| 3,224,007 A | 12/1965 | Mathis | |
| 3,360,798 A | 12/1967 | Webb | |
| 3,385,397 A | 5/1968 | Robinsky | |
| 3,397,399 A | 8/1968 | Carman et al. | |
| 3,406,404 A | 10/1968 | Maier | |
| 3,473,758 A | 10/1969 | Webb | |
| 3,477,662 A | 11/1969 | Anderson | |
| 3,496,687 A | 2/1970 | Greenberg et al. | |
| 3,509,576 A | 4/1970 | McLain | |
| 3,510,086 A | 5/1970 | Arbeitlang et al. | |
| 3,521,290 A | 7/1970 | Bahiman et al. | |
| 3,530,469 A | 9/1970 | Dailey et al. | |
| 3,541,569 A | 11/1970 | Berks et al. | |
| 3,558,219 A | 1/1971 | Buckingham et al. | |
| 3,576,566 A | 4/1971 | Cover, Jr. et al. | |
| 3,617,113 A | 11/1971 | Hoyer | |
| 3,618,111 A | 11/1971 | Vaughan | |
| 3,715,760 A | 2/1973 | Palmer | |
| 3,735,942 A | 5/1973 | Palz | |
| 3,735,943 A | 5/1973 | Fayet | |
| 3,817,481 A | 6/1974 | Berks et al. | |
| 3,863,870 A | 2/1975 | Andrews et al. | |
| 3,913,105 A | 10/1975 | Williamson et al. | |
| 3,978,490 A | 8/1976 | Fletcher et al. | |
| 4,030,102 A | 6/1977 | Kaplan et al. | |
| 4,030,103 A | 6/1977 | Campbell | |
| 4,115,784 A | 9/1978 | Schwerdtfeger et al. | |
| 4,133,501 A | 1/1979 | Pentlicki | |
| 4,315,265 A | 2/1982 | Palmer et al. | |
| 4,337,560 A | 7/1982 | Slysh | |
| 4,352,113 A | 9/1982 | Labruyere | |
| 4,380,013 A | 4/1983 | Slysh | |
| 4,475,323 A | 10/1984 | Schwartzberg et al. | |
| 4,482,900 A | 11/1984 | Bilek et al. | |
| 4,498,087 A | 2/1985 | Imbiel et al. | |
| 4,511,901 A | 4/1985 | Westphal | |
| 4,527,166 A | 7/1985 | Luly | |
| 4,578,920 A | 4/1986 | Bush et al. | |
| 4,613,870 A | 9/1986 | Stonier | |
| 4,636,579 A | 1/1987 | Hanak et al. | |
| 4,642,652 A | 2/1987 | Herbig et al. | |
| 4,646,102 A | 2/1987 | Akaeda et al. | |
| 4,658,265 A | 4/1987 | Heinze et al. | |
| 4,713,492 A | 12/1987 | Hanak | |
| 4,727,932 A | 3/1988 | Mahefkey | |
| 4,747,567 A | 5/1988 | Johnson et al. | |
| 4,769,647 A | 9/1988 | Herbig et al. | |
| 4,780,726 A | 10/1988 | Archer et al. | |
| 4,787,580 A | 11/1988 | Ganssle | |
| 4,811,034 A | 3/1989 | Kaminskas | |
| 4,825,225 A | 4/1989 | Waters et al. | |
| 4,862,190 A | 8/1989 | Palmer et al. | |
| 4,899,167 A | 2/1990 | Westphal | |
| 4,926,181 A | 5/1990 | Stumm | |
| 4,989,015 A | 1/1991 | Chang | |
| 5,016,418 A | 5/1991 | Rhodes et al. | |
| 5,104,211 A | 4/1992 | Schumacher et al. | |
| 5,198,832 A | 3/1993 | Higgins et al. | |
| 5,296,044 A | 3/1994 | Harvey et al. | |
| 5,446,474 A | 8/1995 | Wade et al. | |
| 5,451,975 A | 9/1995 | Miller et al. | |
| 5,487,791 A | 1/1996 | Everman et al. | |
| 5,488,383 A | 1/1996 | Friedman et al. | |
| 5,515,067 A | 5/1996 | Rits | |
| 5,520,747 A | 5/1996 | Marks | |
| 5,574,472 A | 11/1996 | Robinson | |
| 5,644,322 A | 7/1997 | Hayes et al. | |
| 5,680,145 A | 10/1997 | Thomson et al. | |
| 5,700,337 A | 12/1997 | Jacobs et al. | |
| 5,720,452 A | 2/1998 | Mutschler, Jr. | |
| 5,785,280 A | 7/1998 | Baghdasarian | |
| 5,787,671 A | 8/1998 | Meguro et al. | |
| 5,833,176 A | 11/1998 | Rubin et al. | |
| 5,857,648 A | 1/1999 | Dailey et al. | |
| 5,864,324 A | 1/1999 | Acker et al. | |
| 5,927,654 A | 7/1999 | Foley et al. | |
| 5,963,182 A | 10/1999 | Bassily | |
| 5,968,641 A | 10/1999 | Lewis | |
| 5,990,851 A * | 11/1999 | Henderson | H01Q 15/168 343/915 |
| 6,017,002 A | 1/2000 | Burke et al. | |
| 6,028,569 A | 2/2000 | Bassily et al. | |
| 6,028,570 A | 2/2000 | Gilger et al. | |
| 6,104,358 A | 8/2000 | Parker et al. | |
| 6,137,454 A | 10/2000 | Peck | |
| 6,150,995 A | 11/2000 | Gilger | |
| 6,208,317 B1 | 3/2001 | Taylor et al. | |
| 6,219,009 B1 | 4/2001 | Shipley et al. | |
| 6,225,965 B1 | 5/2001 | Gilger et al. | |
| 6,228,441 B1 | 5/2001 | Suzuki et al. | |
| 6,243,053 B1 | 6/2001 | Shtarkman | |
| 6,278,416 B1 | 8/2001 | Harless | |
| 6,313,811 B1 | 11/2001 | Harless | |
| 6,321,503 B1 | 11/2001 | Warren | |
| 6,323,827 B1 | 11/2001 | Gilger et al. | |
| 6,343,442 B1 | 2/2002 | Marks | |
| 6,344,835 B1 | 2/2002 | Allen et al. | |
| 6,353,421 B1 | 3/2002 | Lalezari et al. | |
| 6,373,449 B1 | 4/2002 | Bokulic et al. | |
| 6,384,800 B1 | 5/2002 | Bassily et al. | |
| 6,417,818 B2 | 7/2002 | Shipley et al. | |
| 6,437,232 B1 | 8/2002 | Dailey et al. | |
| 6,441,801 B1 | 8/2002 | Knight et al. | |
| 6,478,261 B2 | 11/2002 | Laraway et al. | |
| 6,542,132 B2 | 4/2003 | Stern | |
| 6,547,190 B1 | 4/2003 | Thompson et al. | |
| 6,568,638 B1 | 5/2003 | Capots | |
| 6,581,883 B2 | 6/2003 | McGee et al. | |
| 6,609,683 B2 | 8/2003 | Bauer et al. | |
| 6,618,025 B2 | 9/2003 | Harless | |
| 6,624,796 B1 | 9/2003 | Talley et al. | |
| 6,637,702 B1 | 10/2003 | McCandless | |
| 6,702,976 B2 | 3/2004 | Sokolowski | |
| 6,735,920 B1 | 5/2004 | Cadogan | |
| 6,772,479 B2 | 8/2004 | Hinkley et al. | |
| 6,775,046 B2 | 8/2004 | Hill et al. | |
| 6,828,949 B2 | 12/2004 | Harless | |
| 6,872,433 B2 | 3/2005 | Seward et al. | |
| 6,904,722 B2 * | 6/2005 | Brown | B64G 1/222 52/645 |
| 6,930,654 B2 | 8/2005 | Schmid et al. | |
| 6,956,696 B2 | 10/2005 | Hachkowski et al. | |
| 6,983,914 B2 | 1/2006 | Stribling et al. | |
| 7,009,578 B2 | 3/2006 | Nolan et al. | |
| 7,059,094 B2 | 6/2006 | Yamawaki | |
| 7,098,867 B1 | 8/2006 | Gullapalli | |
| 7,216,995 B2 | 5/2007 | Harada et al. | |
| 7,429,074 B2 | 9/2008 | McKnight et al. | |
| 7,595,769 B2 | 9/2009 | Bassily | |
| 7,686,255 B2 | 3/2010 | Harris | |
| 7,710,348 B2 | 5/2010 | Taylor et al. | |
| 7,806,370 B2 | 10/2010 | Beidleman et al. | |
| 7,897,225 B2 | 3/2011 | Campbell et al. | |
| 8,061,660 B2 | 11/2011 | Beidleman et al. | |
| 8,066,227 B2 | 11/2011 | Keller et al. | |
| 8,109,472 B1 | 2/2012 | Keller et al. | |
| 8,259,033 B2 | 9/2012 | Taylor et al. | |
| 8,289,221 B1 | 10/2012 | Finucane | |
| 8,356,774 B1 | 1/2013 | Banik et al. | |
| 8,387,921 B2 | 3/2013 | Taylor et al. | |
| 8,462,078 B2 | 6/2013 | Murphey et al. | |
| 8,654,033 B2 | 2/2014 | Sorrell et al. | |
| 8,789,796 B2 | 7/2014 | Boccio et al. | |
| 8,839,585 B2 | 9/2014 | Santiago Prowald et al. | |
| 9,112,282 B2 | 8/2015 | Nurnberger et al. | |

(56) References Cited

U.S. PATENT DOCUMENTS

| | | | |
|---|---|---|---|
| 9,153,860 | B2 | 10/2015 | Tserodze et al. |
| 9,281,569 | B2 | 3/2016 | Taylor et al. |
| 9,331,394 | B2 | 5/2016 | Toledo |
| 9,484,636 | B2 | 11/2016 | Mobrem |
| 9,496,621 | B2 | 11/2016 | Meschini et al. |
| 9,528,264 | B2 | 12/2016 | Freebury et al. |
| 9,608,333 | B1 | 3/2017 | Toledo et al. |
| 9,660,351 | B2 | 5/2017 | Medzmariashvili et al. |
| 9,714,519 | B2 | 7/2017 | Slade |
| 9,755,318 | B2 | 9/2017 | Mobrem et al. |
| 9,774,092 | B2 | 9/2017 | Fujii et al. |
| 9,815,574 | B2 | 11/2017 | Scolamiero et al. |
| 2002/0063660 | A1 | 5/2002 | Harless |
| 2003/0201949 | A1 | 10/2003 | Harless |
| 2011/0210209 | A1 | 9/2011 | Taylor et al. |
| 2013/0186011 | A1 | 7/2013 | Keller et al. |
| 2015/0194733 | A1 | 7/2015 | Mobrem et al. |
| 2015/0244081 | A1 | 8/2015 | Mobrem |
| 2015/0288072 | A1* | 10/2015 | Medzmariashvili ......................... H01Q 15/161 343/881 |
| 2015/0303582 | A1 | 10/2015 | Meschini et al. |
| 2015/0368903 | A1 | 12/2015 | Turse et al. |
| 2016/0352022 | A1 | 12/2016 | Thomson et al. |
| 2017/0222308 | A1 | 8/2017 | Freebury et al. |
| 2017/0256840 | A1 | 9/2017 | Walker et al. |

OTHER PUBLICATIONS

Peral, E., et al., "Radar Technologies for Earth Remote Sensing From CubeSat Platforms," Published in Proceedings of the IEEE, vol. 106. issue 3, Mar. 2018.

European Search Report issued in European Patent Application No. EP19218040 dated May 19, 2020.

* cited by examiner

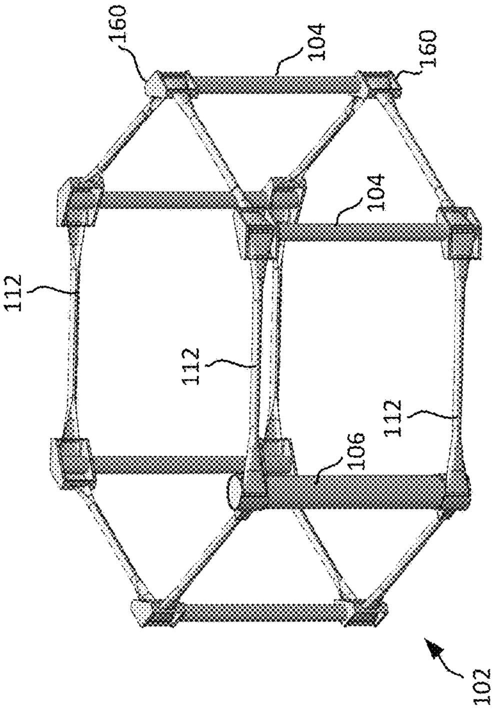
FIG. 6B
FIG. 6C
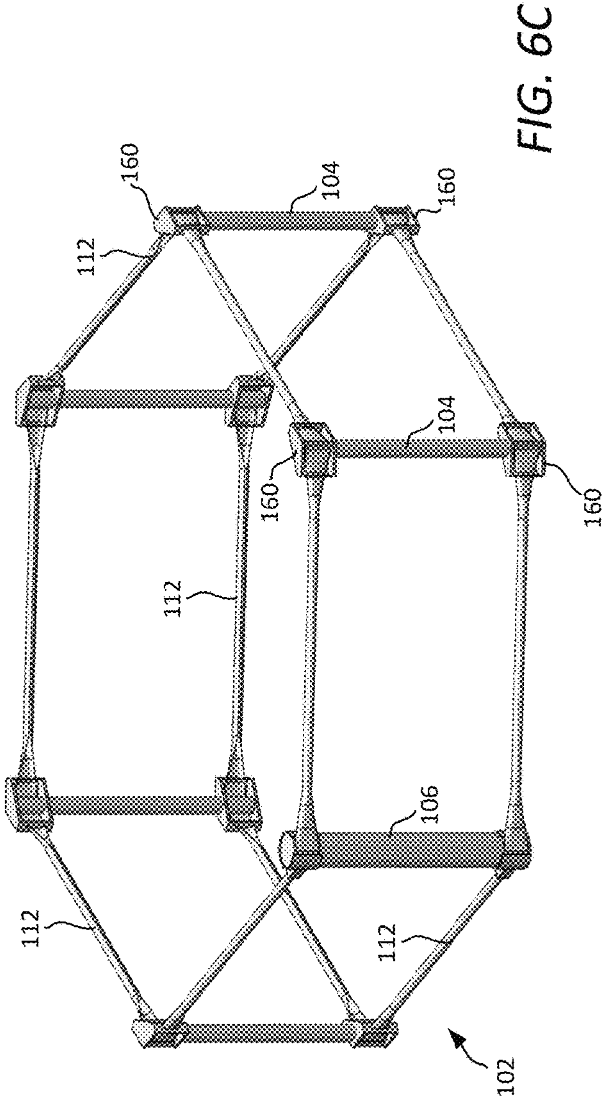
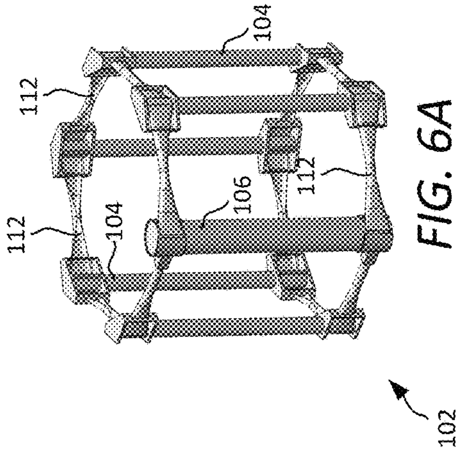
FIG. 6A 102
104
106
112
820

FIG. 17B
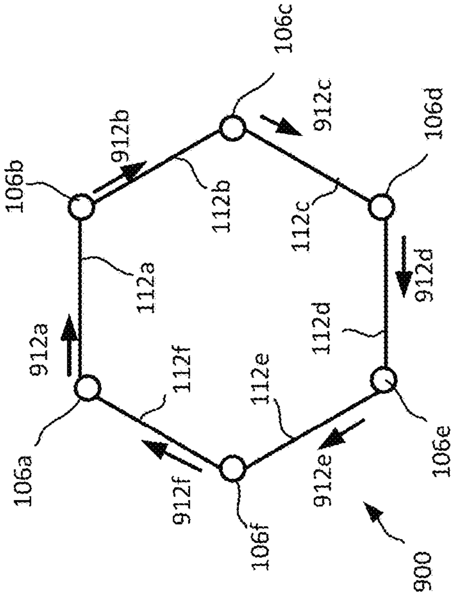
FIG. 17C
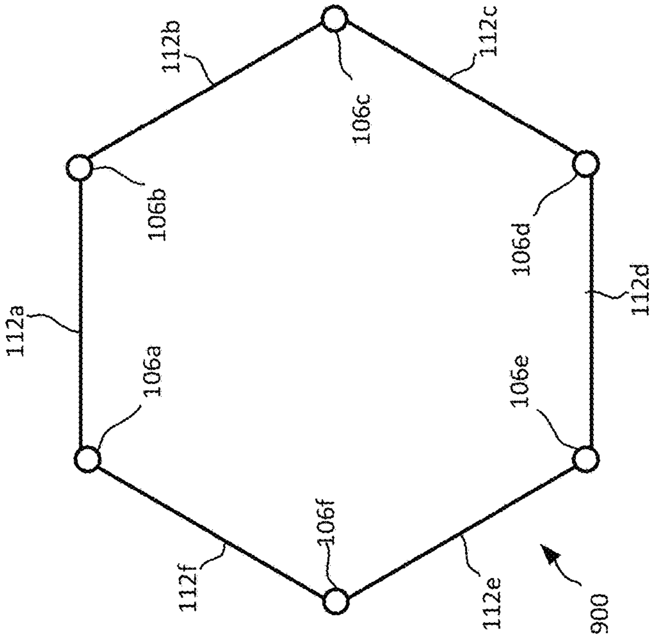
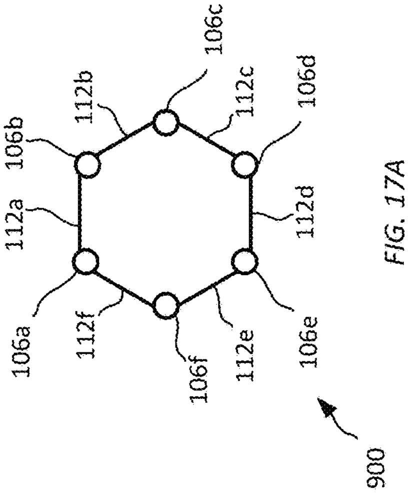
FIG. 17A

COMPACT STORABLE EXTENDIBLE MEMBER REFLECTOR

CROSS REFERENCE TO RELATED APPLICATIONS

This application is a divisional application and claims priority to U.S. patent application Ser. No. 16/249,083 entitled "COMPACT STORABLE EXTENDIBLE MEMBER REFLECTOR" filed on Jan. 16, 2019, the content of which is incorporated herewith in its entirety.

BACKGROUND

Statement of the Technical Field

The technical field of this disclosure concerns deployable reflector antenna systems, and more particularly methods and systems for low-cost deployable reflector antennas that can be easily modified for a wide variety of missions.

Description of the Related Art

Satellites need large aperture antennas to provide high gain, but these antennas must be folded to fit into the constrained volume of the launch vehicle. Small satellites are particularly challenging in this respect since they typically only have very small volume that they are permitted to occupy at launch. Cost is also a critical factor in the commercial small satellite market.

Conventional deployable mesh reflectors can provide a large parabolic surface for increased gain from an RF feed. These systems often involve a foldable framework that can support a reflective mesh surface. However, these systems often require numerous longerons, battens and diagonals with many joints. The high part count and precision required of such systems can make these types of relatively expensive. Accordingly, many of these conventional mesh reflectors are optimized for very large satellites. Consequently, there remains a growing need for a low-cost, offset-fed reflector antenna design that can be easily modified for a wide variety of missions

SUMMARY

This document concerns a perimeter truss reflector. The reflector includes a perimeter truss assembly (PTA) comprised of a plurality of battens, each having an length which traverses a PTA thickness as defined along a direction aligned with a reflector central axis. The PTA is configured to expand between a collapsed configuration wherein the battens are closely spaced with respect to one another and an expanded configuration wherein a distance between the battens is increased as compared to the collapsed configuration such that the PTA defines a hoop. A collapsible mesh reflector surface is secured to the PTA such that when the PTA is in the collapsed configuration, the reflector surface is collapsed for compact stowage and when the PTA is in the expanded configuration, the reflector surface is expanded to a shape that is configured to concentrate RF energy in a predetermined pattern. The PTA also includes one or more longerons. Each of the one or more longerons extend around at least a portion of a periphery of the PTA. These longerons each comprise a storable extendible member (SEM) which can be flattened and rolled around a spool, but exhibits beam-like structural characteristics when unspooled.

The solution also concerns a method for deploying a reflector. The method involves supporting a collapsible mesh reflector surface with a perimeter truss assembly (PTA) comprised of a plurality of battens which define a hoop. A deployed length of an SEM longeron extending around at least a portion of a perimeter of the PTA is increased. This action urges the PTA from a collapsed configuration, in which the battens are closely spaced, to an expanded configuration in which a distance between the battens is increased as compared to the collapsed configuration so as to enlarge an area enclosed by the hoop. Consequently, the collapsible mesh reflector surface is transitioned from a compactly stowed state when the PTA is in the collapsed configuration to a tensioned state when the PTA is in the expanded configuration. The mesh reflector surface is shaped in the tensioned state by using a network of cords supported by the battens so as to urge the mesh reflector surface to a shape that is configured to concentrate RF energy in a predetermined pattern.

BRIEF DESCRIPTION OF THE DRAWINGS

This disclosure is facilitated by reference to the following drawing figures, in which like numerals represent like items throughout the figures, and in which:

FIGS. 6A-6C are a series of drawings which are useful for understanding a transition of a perimeter truss assembly from a collapsed state to a partially expanded state.

FIGS. 17A-17C are a series of drawings which are useful for understanding a first alternative reflector deployment solution in which an SEM-DM is provided at each corner of the reflector in place of the battens.

DETAILED DESCRIPTION

Figure 1:
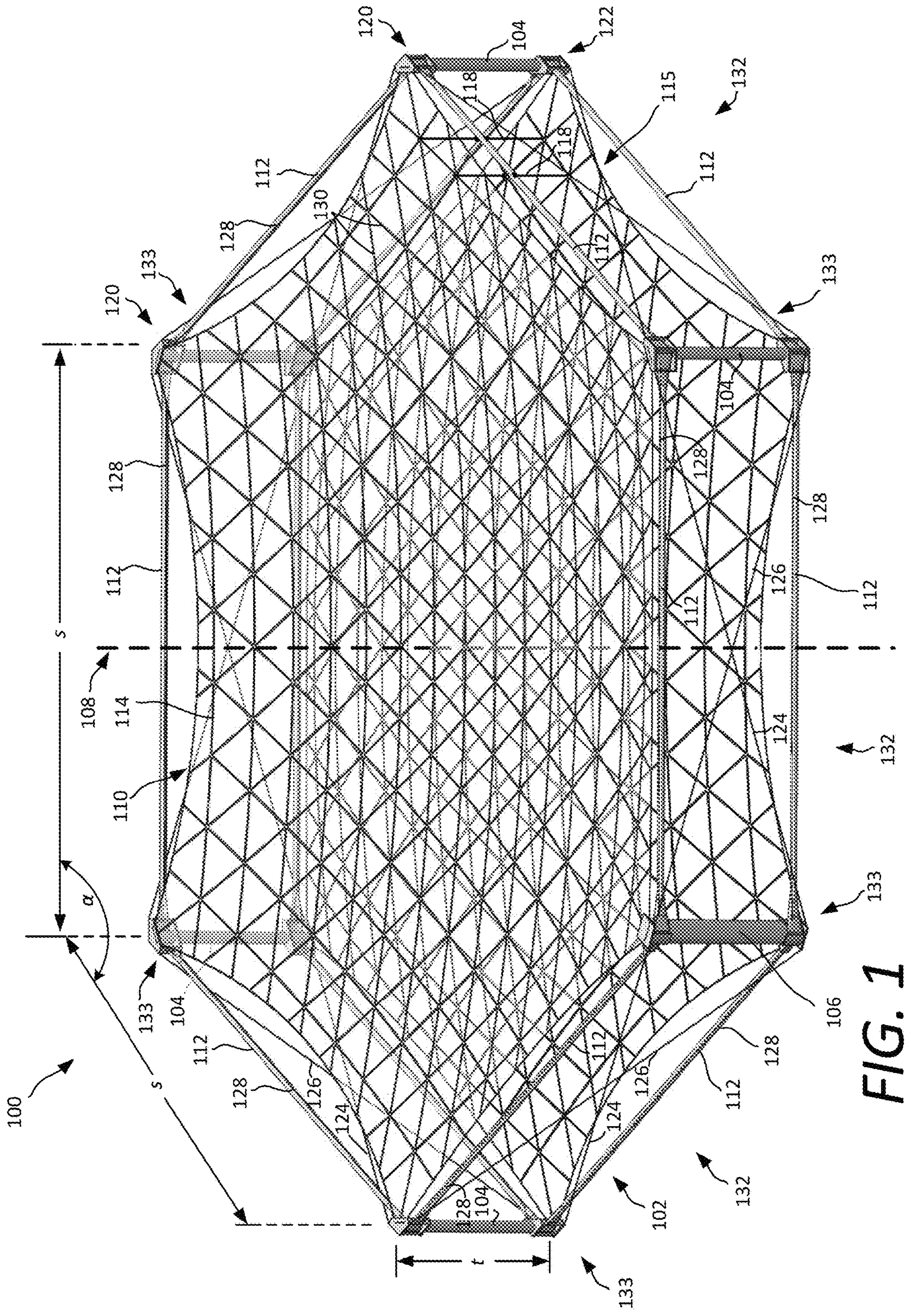
FIG. 1 is a drawing which is useful for understanding certain aspects of a compact reflector which uses a storable extendible member (SEM) as a longeron.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

The solution concerns a compact reflector which uses one or more storable extendible members (SEM) to facilitate deployment and support of the reflector structure. The reflector is a perimeter truss reflector in which one or more longerons which comprise the truss are each formed from an SEM. The SEM comprising the longeron is flattened and bent where it extends around the truss corners. Each of these corners is respectively associated with a corresponding one of a plurality of battens. The SEM is stowed on a spool at a single location on the periphery. During deployment, the elongated length of each longeron is free to move around each truss corner in a direction transverse to the length of the batten, thereby expanding all the bays. At full deployment, a spacing between the battens is fixed by a network of tension members and the mesh surface of the reflector.

Figure 16:
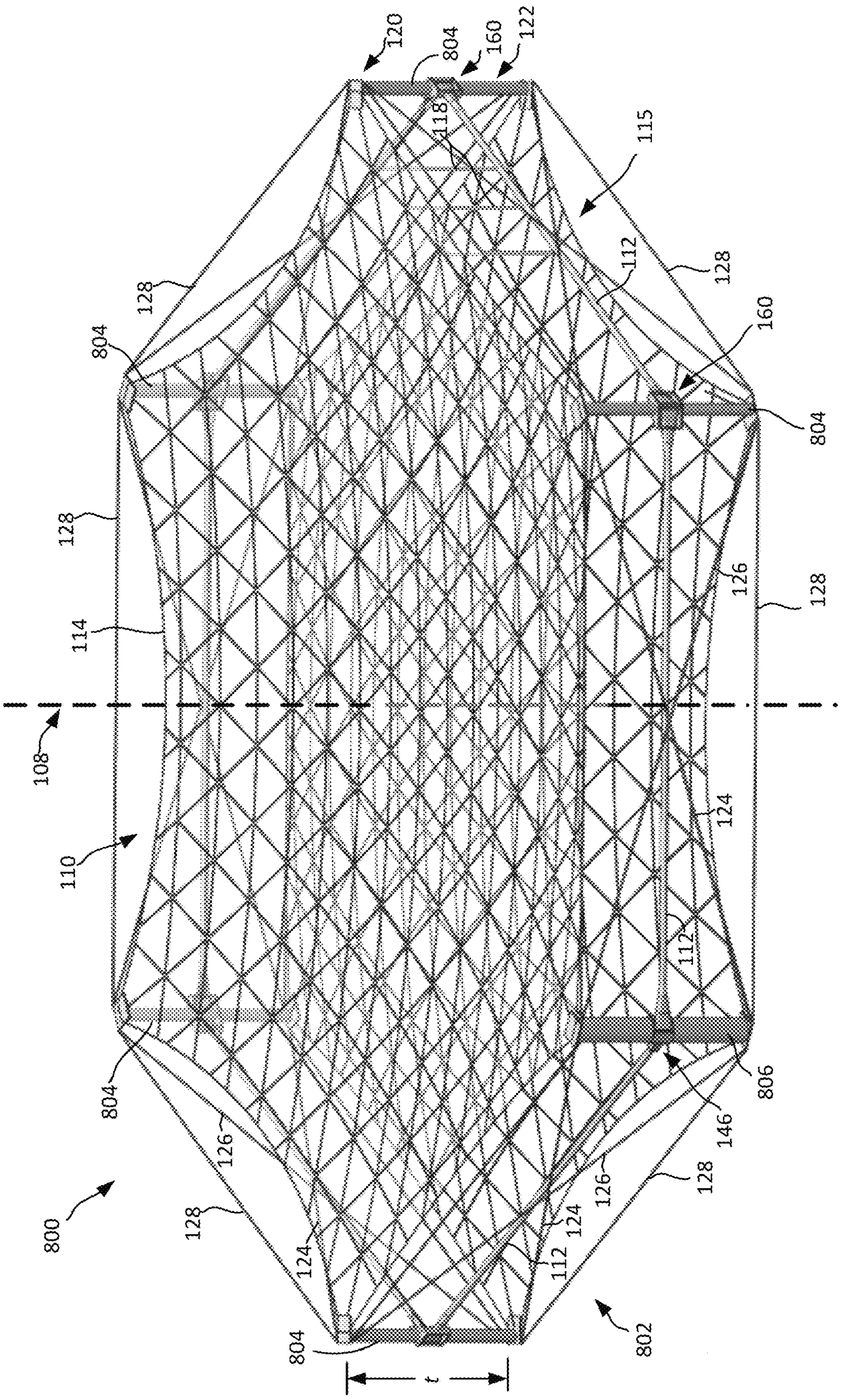
FIG. 16 is a drawing which is useful for understanding an alternative reflector in which only a single SEM is used to expand the perimeter truss assembly.

An illustrative example of a deployable reflector 100 is shown in FIGS. 1-4. The reflector 100 includes a perimeter truss assembly (PTA) 102 comprised of a plurality of battens 104 and an SEM deployment member (SEM-DM) 106. The battens and the SEM-DM are rigid members, each having an elongated length. As such, these structures can be comprised of a strong lightweight material such as an aluminum alloy and/or a composite material. The battens 104 and the SEM-DM 106 are connected by a plurality of tension members 124, 126, 128 and one or more longerons 112 so as to form a hoop-like structure. In some scenarios, tension members 128 can be disposed within or adjacent to the longerons. Each of the battens 104 and the SEM-DM 106 can traverse a PTA thickness t as defined along a direction aligned with a reflector central axis 108. In some scenarios, the battens 104 can be linear elements aligned with the reflector central axis 108. However, the solution is not limited in this respect and in other scenarios the battens can be curved along at least a portion of their overall length. In the example shown in FIG. 1, the PTA includes two longerons 112, which are disposed respectively at opposing upper and lower end portions 120, 122 of the battens 104. The longerons 112 each extend circumferentially around at least a portion of a periphery of the PTA 102. In the example shown, each longeron 112 extends completely around the periphery of the PTA, but other scenarios are possible. FIG. 16 shows an example of a similar reflector 800 in which a single longeron 112 extends circumferentially around a PTA 802, comprised of battens 804 and SEM-DM 806.

As explained below in greater detail, each of the longerons 112 are advantageously comprised of an SEM. As used herein, an SEM can comprise any of a variety of deployable structure types that can be flattened and stowed on a spool for stowage, but when deployed or unspooled will exhibit beam-like structural characteristics whereby they become stiff and capable of carrying bending and column loads. Deployable structures of this type come in a wide variety of different configurations which are known in the art. Examples include slit-tube or Storable Tubular Extendible Member (STEM), Triangular Rollable and Collapsible (TRAC) boom, Collapsible Tubular Mast (CTM), and so on. Each of these SEM types are well-known and therefore will not be described here in detail.

SEMs offer important advantages in deployable structures used in spacecraft due to their ability to be compactly stowed, retractable capability, and relatively low cost. The longerons 112 can be comprised of metallic SEMs but such metallic SEMs are known to require complex deploying mechanism to ensure that the metallic SEM deploys properly. Accordingly, it can be advantageous in the reflector solution described herein to employ SEMs which are formed of composite materials. For example, the SEMs can be comprised of a fiber-reinforced polymer (FRP). Such composite SEMs can be composed of several fiber lamina layers that are adhered together using a polymer matrix.

In a slit-tube or STEM scenario, the slit in the tube allows the cross section to gradually open or transition from a circular cross section to a flat or partially flattened cross section. When fully opened or transitioned to the flat or partially flattened cross section, the STEM can be curved or rolled around an axis perpendicular to the elongated length of the STEM. The flattened state is sometimes referred to herein as the planate state. For convenience the solution will be described in the context of a STEM which transitions between a circular state and a flat or flattened, planate state. It should be understood, however, that the solution presented is not limited to this particular configuration of STEM shown. Any other type of SEM design can be used (whether now know, or known in the future) provided that it offers similar functional characteristics, whereby it is bendable when flattened, rigid when un-flattened or deployed.

Each longeron 112 is flattened and open where it changes direction at each batten 104. For a PTA which has the shape of a regular polygon, the longerons 112 will form an equal interior angle $\alpha$ at each batten. The batten advantageously include guide members 160 which include one or more contact surfaces 161, 163, 165 that are offset from the batten to enforce this angle $\alpha$ between the longeron sections on either side. The longerons 112 each gradually transition back to a circular cross section on either side of each batten 104. The longerons 112 can be securely attached to one side of the SEM-DM 106 by means of a lug 146 and on an opposing end is driven outwardly from a spool. In the stowed state, the longerons 112 may not be long enough to transition back to circular and therefore could be largely flat between the battens.

In a solution disclosed herein, a collapsible reflector 110 is secured to the PTA such that reflector surface 114 is shaped to concentrate RF energy in a predetermined pattern. The collapsible reflector 110 is advantageously formed of a pliant RF reflector material, such as a conductive metal mesh. As such, the reflector is 110 is sometimes referred to herein as a collapsible mesh reflector. The collapsible mesh reflector can be supported by a front net 130 comprised of a network of cords or straps. The front net 130 and the collapsible mesh reflector 110 which supports it can be secured to an upper portion 120 of each of the battens 104 and the SEM-DM 106.

A rear net 115, which is also comprised of a network of cords or straps, can be attached to a lower portion 122 of each of the battens, opposed from the front net 130 and the reflector surface 114. A plurality of tie cords 118 can extend from the rear net 116 to the front net 130 to help conform the reflector surface to a dish-like shape that is suited for reflecting RF energy. In FIGS. 1-4, most of the tie cords 118 are omitted to facilitate greater clarity in the drawing.

The PTA 102 is comprised of a plurality of sides or bays 132 which extend between adjacent pairs of the battens 104. In each bay 132, the PTA 102 includes a plurality of truss cords which extend between adjacent battens 104. For example, the plurality of truss cords can include a plurality of truss diagonal tension cords 124 which extends between a first and second batten (which together comprise an adjacent batten pair) from an upper portion of the first batten, to a lower portion of the second batten. A second truss diagonal tension cord 126 can extend between the lower portion of the first batten and an upper portion of the second batten. These truss diagonal extension cords 124, 126 can also extend between the SEM-DM 106 and its closest adjacent battens 104. Each bay 132 can also include at least one truss longitudinal tension cord 128 which extends between adjacent batten 104 in a plane which is orthogonal to a reflector central axis 108. In some scenarios, these truss longitudinal tension cords 128 can be disposed so that that a first cord 128 extends between the upper portion 120 of each batten 104, and a second cord 128 extends between the lower portions 122 of each batten. In FIGS. 1-4, some of the truss cords 124, 126, 128 are omitted to facilitate greater clarity. However, it should be understood that each bay 132 will generally include a similar arrangement of diagonal and longitudinal truss cords 124, 126, 128.

Figure 5:
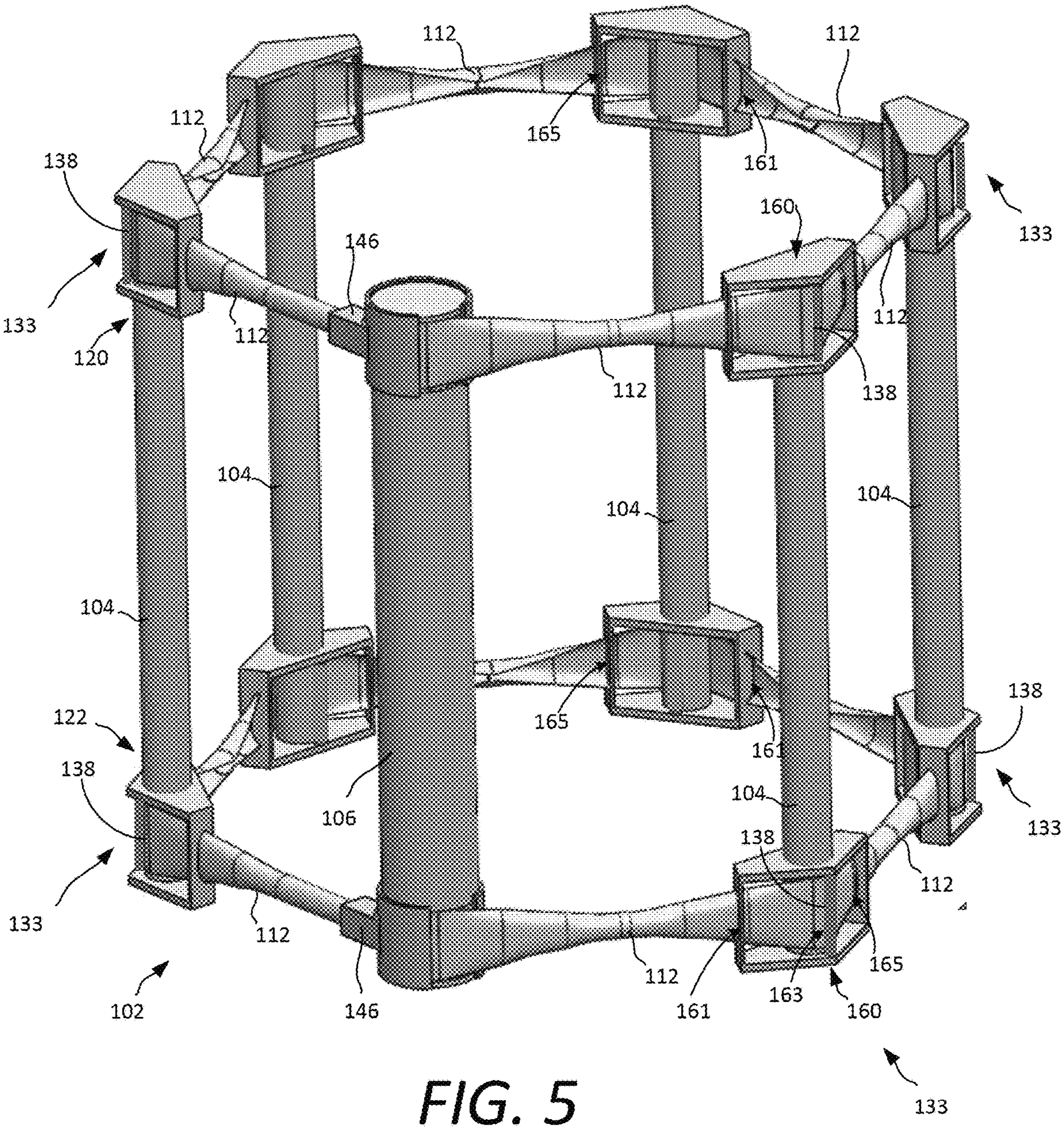
FIG. 5 is a drawing which is useful for understanding a collapsed state of a perimeter truss assembly for a compact SEM reflector.

The PTA 102 in FIGS. 1-4 is shown in an expanded state. However, it should be understood that the PTA is advantageously configured to transition to this expanded state from a collapsed configuration or state, which is shown in FIG. 5. It can be observed in FIG. 5 that when the PTA 102 is in the collapsed configuration, the battens 104 are closely spaced with respect to one another (and with respect to the SEM-DM 106). Consequently, an area enclosed by the PTA can be relatively small in the collapsed configuration. This ensures that the PTA can have a very compact size when it is stowed onboard a spacecraft. Conversely, in the expanded configuration shown in FIG. 1-4, a distance between the battens 104, and the area enclosed by the PTA, is substantially increased as compared to the collapsed configuration. The larger area is useful for maximizing the size of a collapsible mesh reflector 110 when the reflector is positioned on orbit after deployment. According to one aspect, the collapsible mesh reflector 110 can be attached to the battens 104 by resilient members, such as springs (not shown) so as to isolate hard structure (e.g., the battens 104 and SEM-DM 106) from precision shaping elements (e.g., front and rear nets, 130, 115 and attaching cords 118). According to another aspect, the tie cords 188 could include a resilient member, such as springs (not shown), to provide forces between the front net 115 and the rear net 130 that are less sensitive to the position of the hard structure (e.g., the battens 104 and SEM-DM 106).

The transition of the PTA 102 from the collapsed state to its expanded state is facilitated by the longerons 112. This transition process is partially shown in FIGS. 6A-6C. The longerons 112 are configured to urge the collapsible mesh reflector surface 110 and the plurality of truss cords 124, 126, 128 to a condition of tension when the SEM which comprises each longeron is extended from a stowed configuration to a deployed configuration. The longerons are considered to be in a stowed configuration when a major portion of the longeron is disposed on a spool contained within the SEM-DM 106. The longerons are considered to be in a deployed configuration when a major portion of each longeron is extended from the spool. In this regard, it can be observed in FIGS. 6A-6C that the extension of the longerons can progressively urge the battens 104 to become further separated in distance as the extended length of the longeron is increased. This arrangement will now be described in greater detail.

Figure 2:
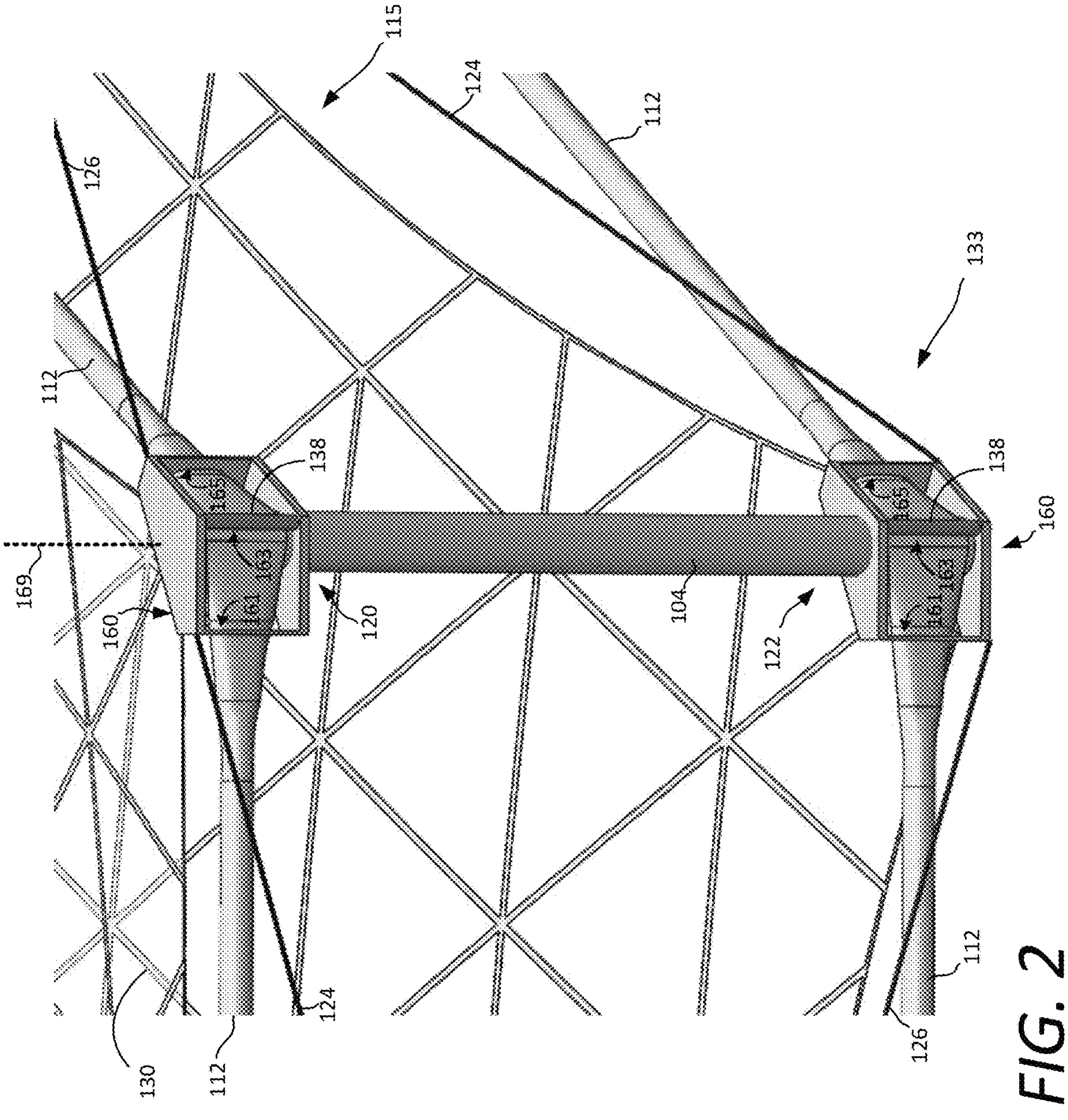
FIG. 2 is an enlarged front perspective view of a batten associated with the reflector in FIG. 1.
Figure 3:
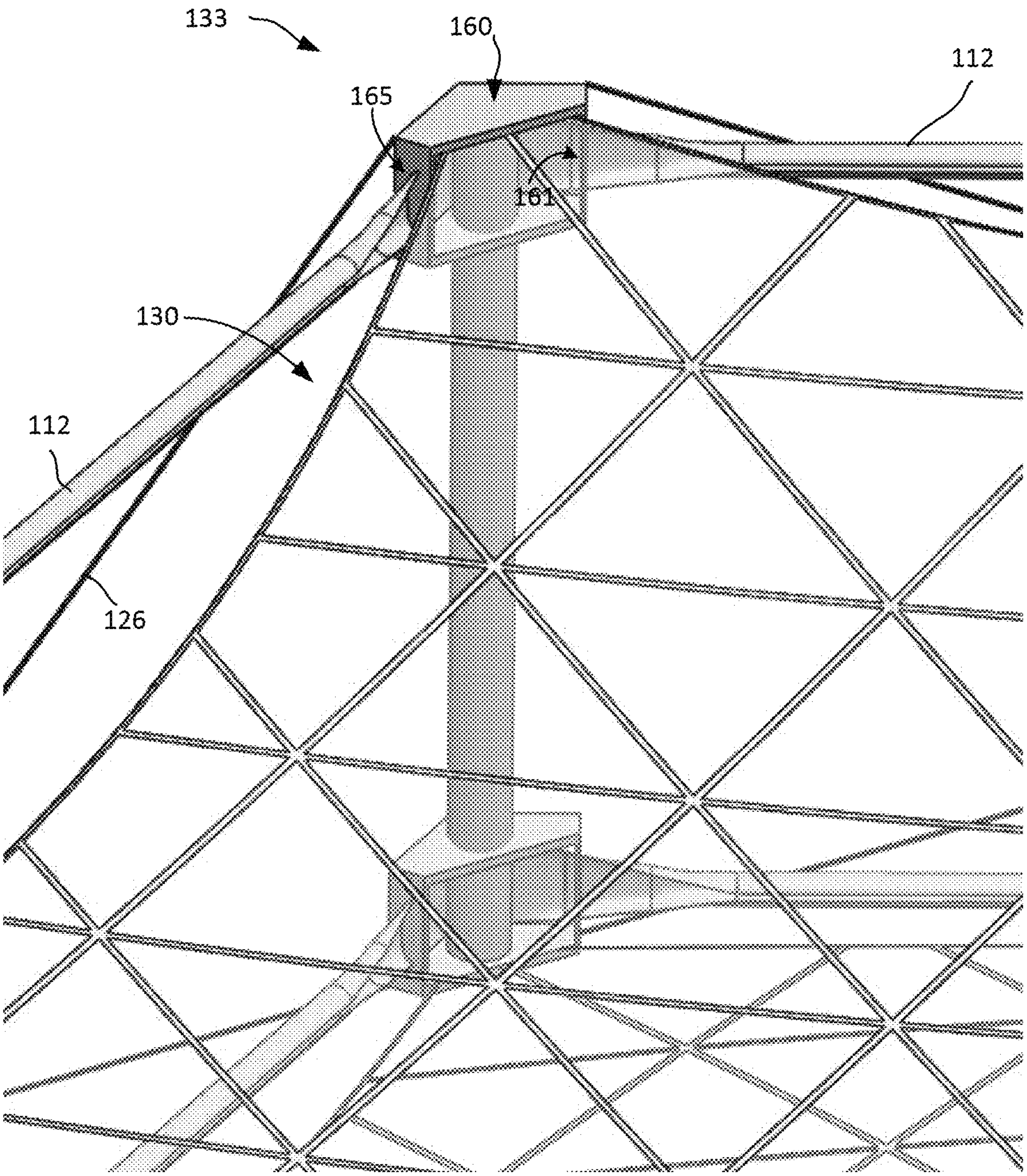
FIG. 3 is an enlarged rear perspective view of a batten associated with the reflector in FIG. 1.
Figure 4:
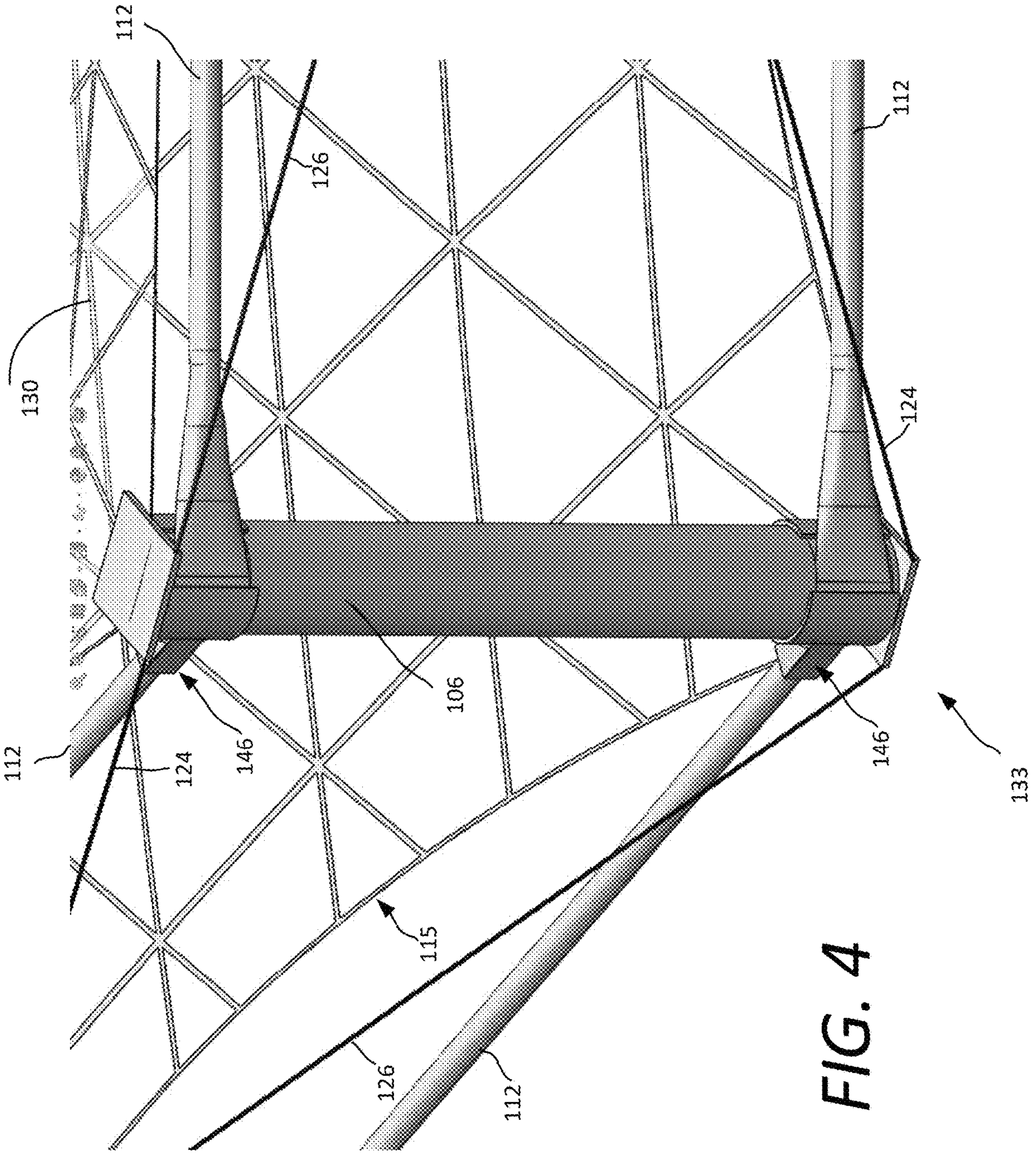
FIG. 4 is an enlarged view of an SEM-deployment member (SEM-DM) 106.

When in a planate state the SEM comprising the longeron 112 will have a flattened configuration in which a length and width of the SEM are relatively broad as compared to the thickness of the SEM. When in this condition, the longeron can be rolled on a spool to reduce the overall volume of the structure. In FIGS. 2-3 and 5, it can be observed that when in the planate state the SEM comprising each longeron 112 can also be mechanically flattened at each of the truss corners 133 to allow the longeron 112 to be bent or curved around an axis 169 of each batten. When flattened, the SEM can be rolled around an axis which extends in a direction perpendicular to the elongated length of the SEM. Consequently, the SEM can be conveniently spooled in an SEM-DM 106 for efficient stowage, as shown and described in relation to FIG. 7. The SEM (which is a slit-tube or STEM in this scenario) can be rolled toward the concave side of the of the extended tube as shown or it can be rolled away from the concave side. In the absence of a force or curvature that keeps the SEM in its planate state, the SEM can tend to revert or transition to a deployed state. For example, the SEM deployed state in the solution shown in FIGS. 1-5 is substantially tubular with a slit extending down the elongated length of the tube. This deployed state of the SEM can be best observed for example in FIGS. 2 and 3 at locations along the length of each longeron 112 which are spaced some distance apart from the truss corners 133. When in this deployed state, the SEM exhibits substantial rigidity and forms stable structural members which are resistant to bending and compressive forces exerted along an elongated length of the SEM. The reflector system 100 is an example reflector system incorporating one type of SEM having a cylindrical or semi-cylindrical profile when in the deployed state. However, it should be understood that many different types of SEMs are possible and the solution is not limited to the particular type of SEM that is shown. For example, a tape measure used in carpentry is a SEM where only a shallow angle of curvature is used. Any suitable SEM type which is now know or known in the future can be used to form the longerons 112.

Figure 7:
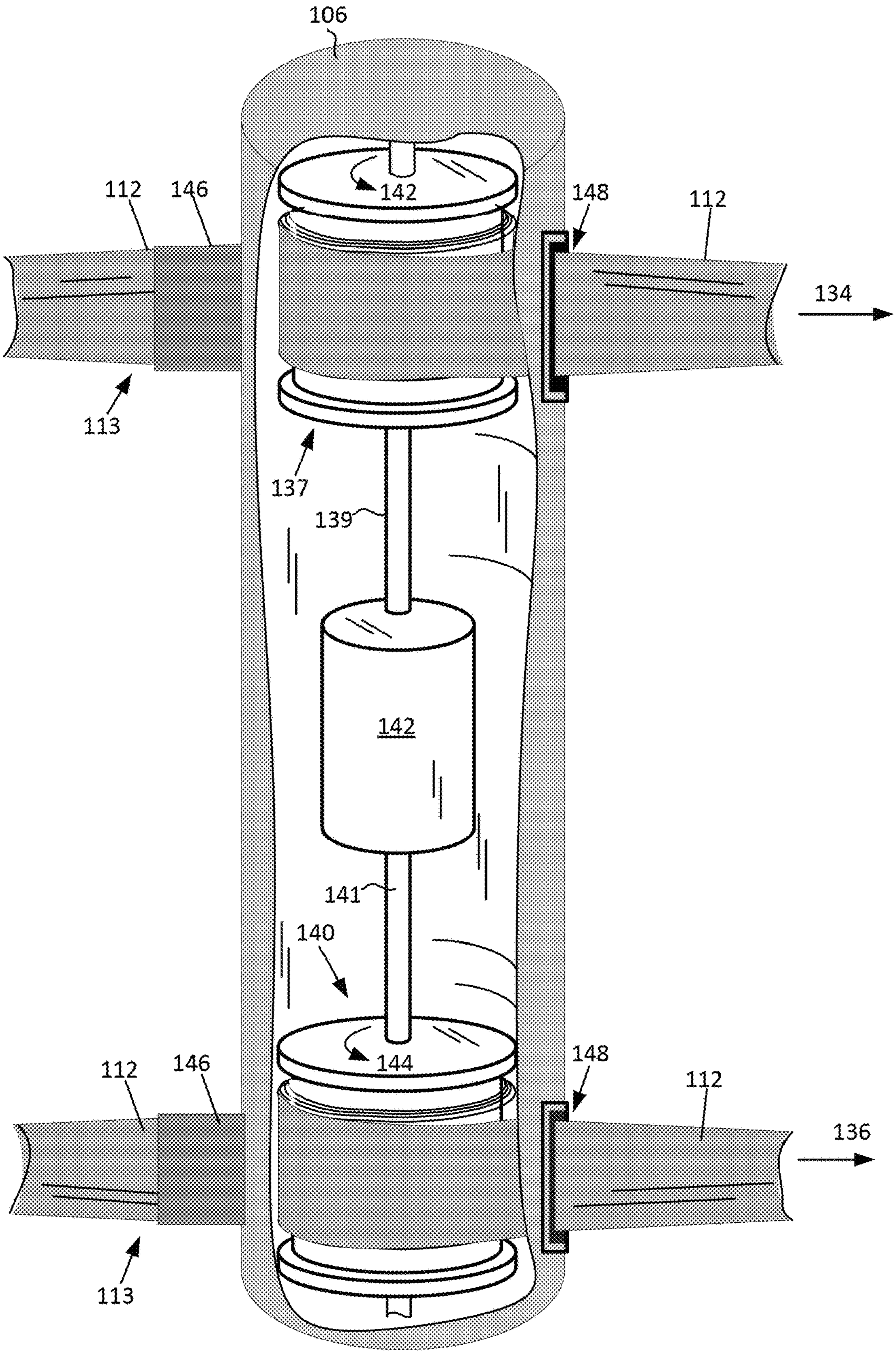
FIG. 7 is a drawing which is useful for understanding certain features associated with an SEM-DM of the perimeter truss assembly.

An illustrative SEM-DM 106 shown in FIG. 7 can comprise one or more spools 137, 140. A major length of each longeron 112 is disposed on these spools when the longerons are in the stowed configuration. In some scenarios, the spools 137, 140 can be journaled on one or more drive shaft 139, 140 so that the spools can rotate with respect to the SEM-DM 106. The rotation of these drive shafts and spools 137, 140 can be controlled by at least one motor 142 which is disposed within the SEM-DM. In some scenarios, the motor 142 can be an electric motor. The motor 142 is advantageously configured so that upon activation, it will urge rotation of the spools 137, 140 in directions 142, 144. For example, this rotation can be facilitated by applying a rotation force through the one or more drive shafts 139, 141.

The rotation of the spools as described will cause the longerons 112 to deploy from the spools in the direction indicated by arrows 134, 136. In some scenarios, the longerons 112 can deploy from an interior of the SEM-DM 106 through a slot or channel 148. The longerons move through the slots 148 in directions 134, 136 as they extend or deploy from the spools. A tip end 113 of each longeron 112 that is distal from an opposing root end attached to a spool 137, 140 can be firmly secured to the structure of the SEM-DM 106 by means of a suitable anchor member or lug 146.

As shown in FIGS. 1-5 the PTA 102 will include a plurality of truss corners 133. Each of the truss corners 133 is respectively defined at a corresponding one of the plurality of battens 104. A truss corner 133 is also defined at the SEM-DM 106. According to one aspect of the solution presented herein, the one or more longerons 112 are bent or curved around each of the battens 104 where the longeron extends around the truss corners. Further, the PTA is configured so that an elongated length of each of the one or more longerons 112 will move transversely with respect to the elongated length of each of the battens. Stated differently, the longerons 112 will move transversely to an axis 169 aligned with the length of each batten. For example, such movement can occur as the PTA 102 is transitioned from the collapsed or stowed configuration shown in FIG. 5 to the expanded configuration shown in FIG. 1.

Figure 8:
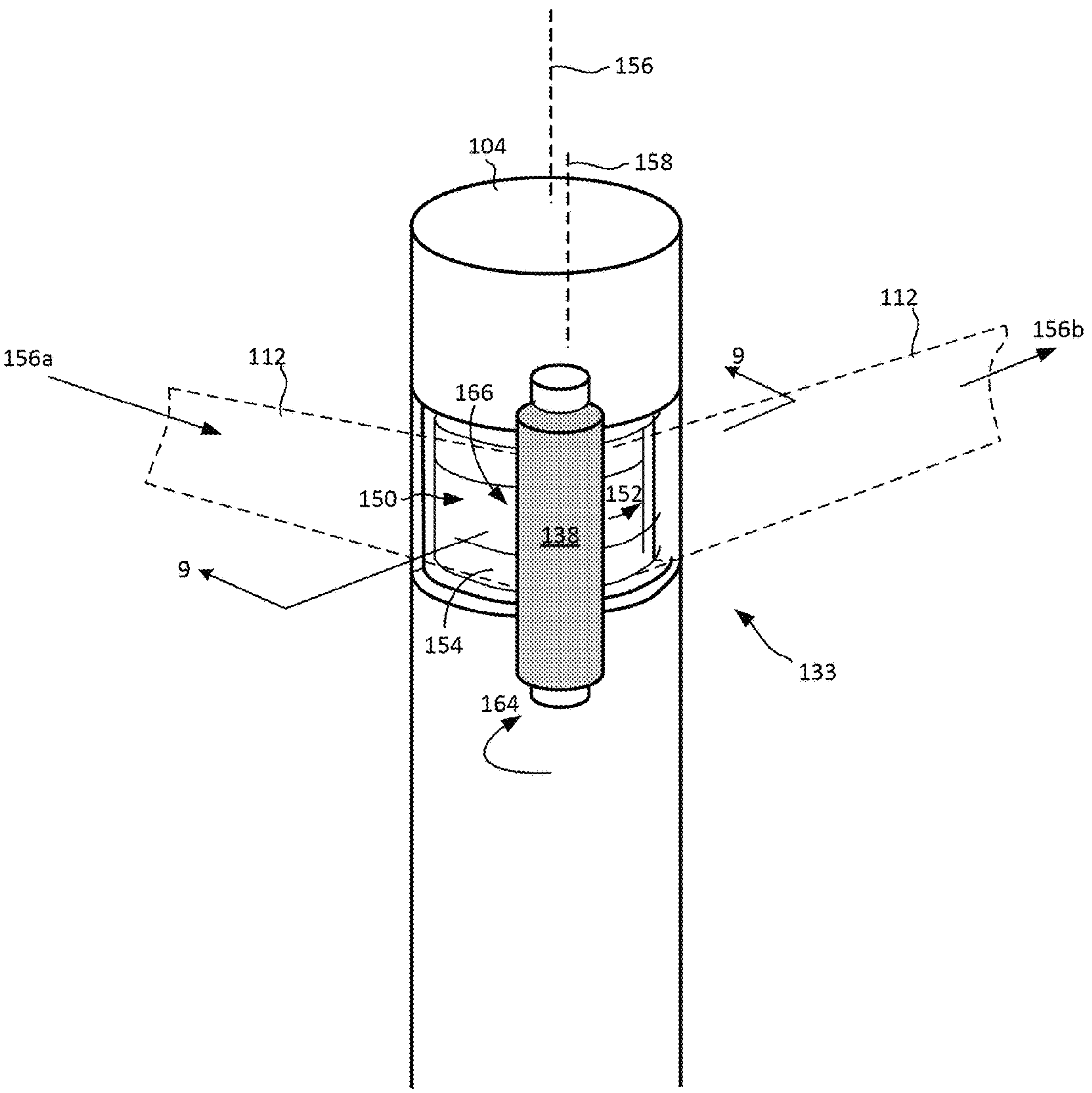
FIG. 8 is a drawing which is useful for understanding certain features associated with a batten of the perimeter truss assembly.
Figure 9:
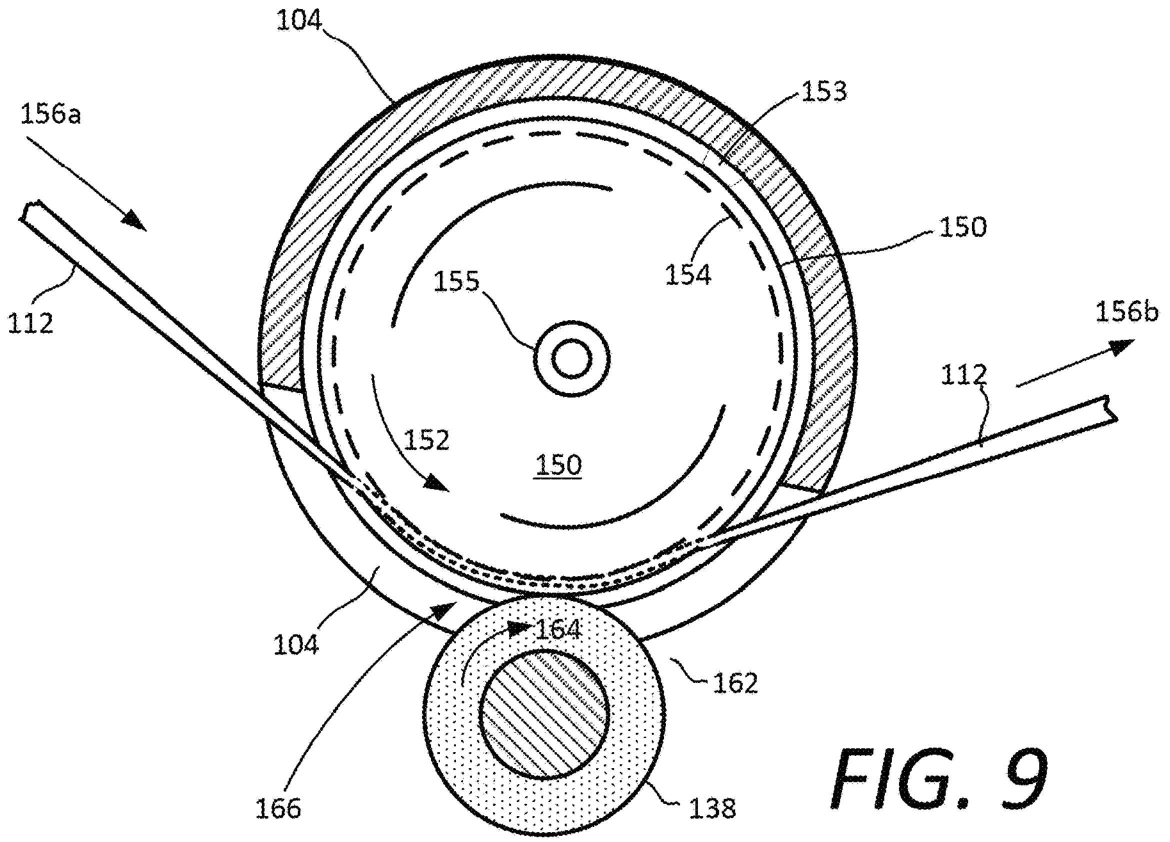
FIG. 9 is a cross-sectional view along line 9-9 in FIG. 8.

Each of the battens 104 can optionally be comprised of a friction-reducing member The friction reducing member is configured to reduce a friction force exerted on the longeron 112 as the longeron moves transversely around the truss corner. As shown in FIGS. 8 and 9 a friction reducing member can in some scenarios be implemented as a roller guide, such as batten roller 150. The batten roller 150 can be configured to rotate about a rotation axis 156 in a direction 152 with respect to the batten 104. This rotation action allows the longeron 112 to move easily around the truss corner 133 as it is guided along the roller surface 154 of the batten roller. In a scenario shown in FIGS. 8 and 9, a contact surface can in some scenarios be configured as a rotating member in the form of a pinch roller 138. The pinch roller 138 can be configured to rotate about an axis 158 in a bearing provided within the guide member 160. To facilitate greater clarity, the guide member 160 is omitted in FIGS. 8 and 9. However, it will be appreciated that the arrangement of the pinch roller 138 can facilitate rotation of the pinch roller 138 in a direction as indicated by arrow 164. The combination of the friction-reducing member (e.g., batten roller 150) and the pinch member (e.g., pinch roller 138) can form a pinch zone 166. The pinch zone comprises a limited cross-sectional area through which the longeron travels as the longeron moves transversely with respect to the batten 105. The dimensions of the pinch zone are chosen such that the longeron 112 is flattened as it travels around the truss corner in directions 156*a*, 156*b* and passes between the two opposing rollers 138, 150.

In FIGS. 8 and 9 only the batten roller and pinch roller at the upper portion 120 of the batten 104 are shown. However, it should be understood that similar configurations of batten rollers and pinch rollers can be provided at other locations along the length of the batten where the batten is traversed by a longeron. For example, in the scenario shown in FIG. 1, a similar configuration of batten roller and pinch roller could be provided at a lower portion 122 of the batten. Conversely, in the scenario shown in FIG. 16, only a single batten roller and pinch roller would be required at each batten.

Figure 10:
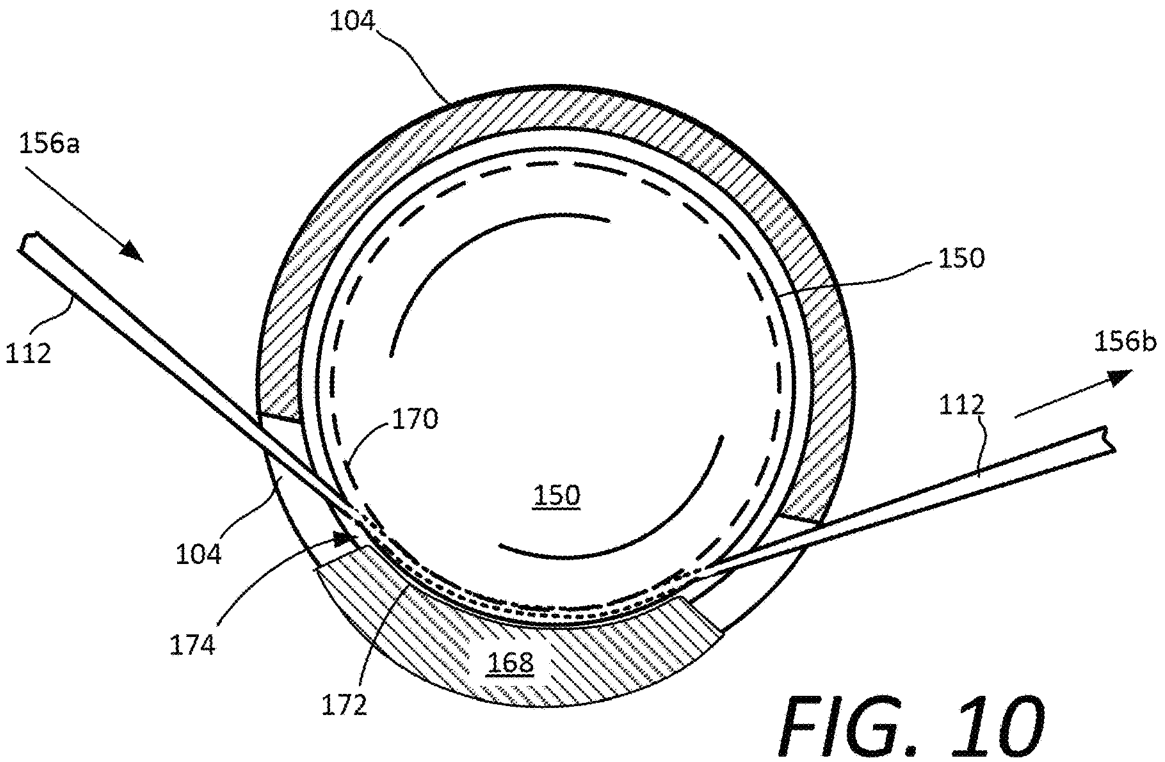
FIG. 10 is a cross-sectional view which is useful for understanding an alternative configuration of a batten.

Of course, other configurations are possible and the solution is not intended to be limited to the roller configuration shown in FIGS. 8 and 9. For example, FIG. 10 shows an example in which a friction-reducing member 150 can be a fixed surface having a convex face 170. Such convex or curved face 170 can be comprised of a polished metal surface and/or a low-friction polymer material. Examples of such low-friction polymer materials can include polyoxymethylene (POM), acetal, nylon, polyester, and/or polytetrafluoroethylene (PTFE) among others. In such a scenario, the pinch member 168 can be comprised of a fixed guide member having a concave face 172. A pinch zone 174 is defined in the space between the friction reducing member 150 and the fixed guide member 168 to flatten the SEM which comprises the longeron.

Figure 11:
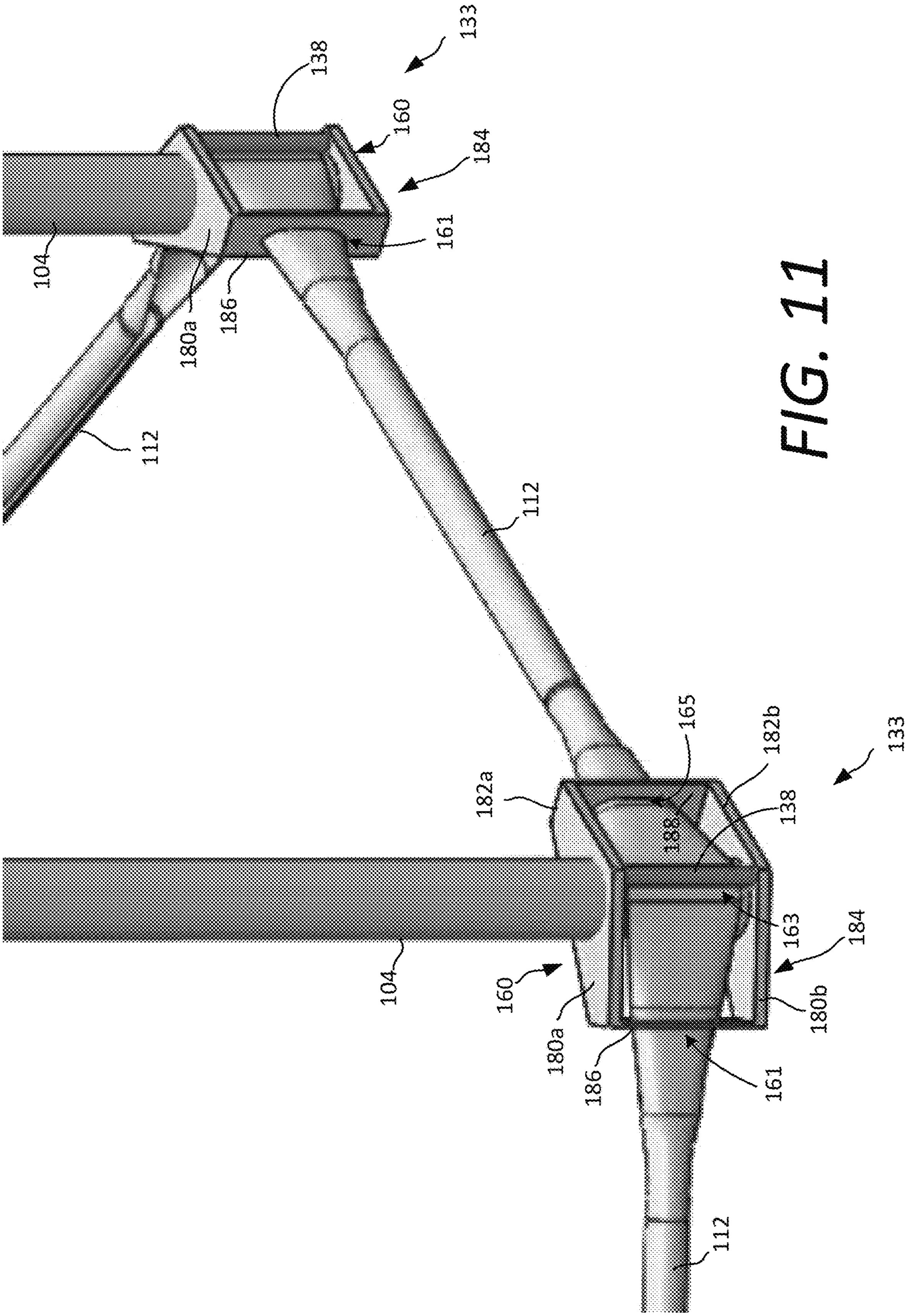
FIG. 11 is a drawing which is useful for understanding certain features associated with an example longeron guide member.

Referring now to FIG. 11, it can be observed that each guide member 160 will define a plurality of contact surfaces 161, 163, 165 to maintain the angle between the longeron 112 on either side. In some scenarios, one or more of these contact surfaces 161, 165 can be disposed on arms 180*a*, 180*b*, 182*a*, 182*b* which comprise part of a frame 184. The arms 180*a*, 180*b*, 182*a*, 182*b* can be configured to extend on either side of the batten 104 as shown. According to one aspect shown in FIG. 11, the arms 180*a*, 180*b*, 182*a*, 182*b* can define a rigid frame 184 whereby the contact surfaces can be configured to remain in a fixed location during stowage and deployment. However, in other scenarios (not shown) the arms can have a deployable configuration such that contact surfaces 161, 165 are located closer to the batten 104 when the PTA is in its stowed configuration, and are extended further away from the batten 104 when the PTA in the deployed state. For example, the extension of the contact surfaces could be urged by the deployment of the batten or by springs (not shown) that drive the contact surfaces outward from the batten during deployment.

The contact surfaces 161, 165, 168 can be configured so that they touch the concave side, convex side or the edges of the longeron 112. Further, the contact surfaces may engage the longeron in the transition zone where the longeron is in the process of transitioning to a flattened state, or after the longeron has returned to the deployed state where it has a circular cross section. As an example, each of the contact surfaces 161, 165 could comprise curved slot in a rigid face 186, 188 that the longeron passes through. However, the solution is not limited in this regard and in other scenarios there could be one or more discrete contact surfaces. In some scenarios, these contact surfaces could be comprised of a low friction material so that they slide over the surface of the longeron. Alternatively, the contact surfaces could be configured to be rollers or bearings.

In the SEM-DM the deployment of two or more longerons 112 can be coordinated by disposing the spools 137, 140 on a common drive shaft 139/141. However, in some scenarios it can be advantageous to exercise additional control over the deployment of the longerons at each batten 104. As such, it can be advantageous to coordinate the travel of each longeron 112 as it passes through one or more pinch zones associated with a particular batten 104. To facilitate this result, the rotation of a first batten roller 150 (e.g., at an upper portion 120 of the batten) can be coordinated with a rotation of a second batten roller 150 (disposed for example at a lower portion 122 of the batten). In an example shown in FIGS. 8 and 9, this coordination can be facilitated by an axle shaft 155 which synchronizes the rotation of the all roller battens 150 disposed within a particular batten 104. If such coordination is desired in a particular scenario, the roller surface 154 and/or a material comprising a surface of the pinch roller can be chosen to be a relatively high friction material so that any transverse movement of the longeron through the pinch zone is only possible with a corresponding rotation of the batten roller and pinch roller.

From the foregoing it will be understood that a longeron 112 is free to move transversely with respect to the batten 104 as the deployed length of the longeron 112 is increased. As a longeron 112 is unspooled in this way, the perimeter of the PTA will increase and urge the battens 104 to the expanded state which is shown in FIG. 1. Note that the resulting spacing s between adjacent battens 104 is fixed at full deployment by a tension member network including the mesh surface 110, diagonal truss members 124, 126 and longitudinal truss members 128. The angle between the adjacent faces is enforced by the contact surfaces 161, 163, 165 that maintain the angle of the longerons.

Figure 12C:
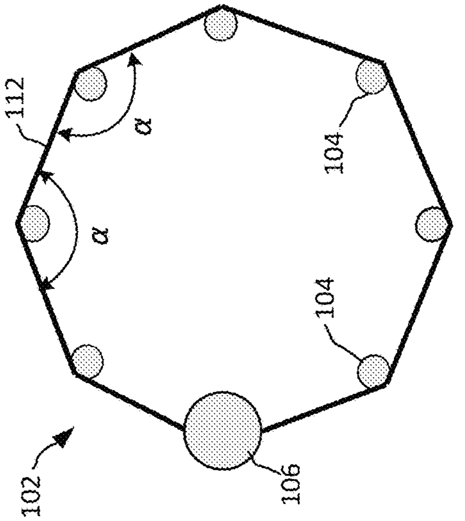
FIGS. 12A-12C are a series of drawings that are useful for understanding a first example of a reflector deployment process.
Figure 12B:
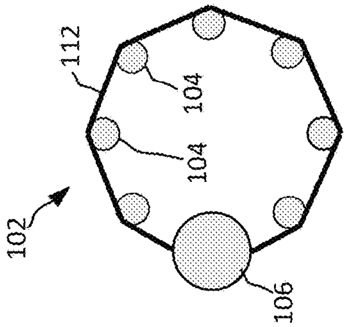
Figure 12A:
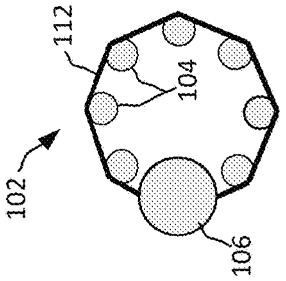

Turning now to FIGS. 12A-12C (collectively FIG. 12), there is illustrated a first series of drawings which are useful for understanding a progressive transition of the PTA 102 from a collapsed configuration to a fully expanded configuration. FIG. 12 shows an example in which the PTA 102 is configured so that all bays expand with uniform spacing between battens. In such a scenario, symmetry among each of the bays or sides can be enforced during and after the expansion process by means of the guide members 160, which ensure that an equal interior angle α is maintained at each batten. Consequently, the sides or bays of the PTA 102 all extend at the same rate.

Figure 13D:
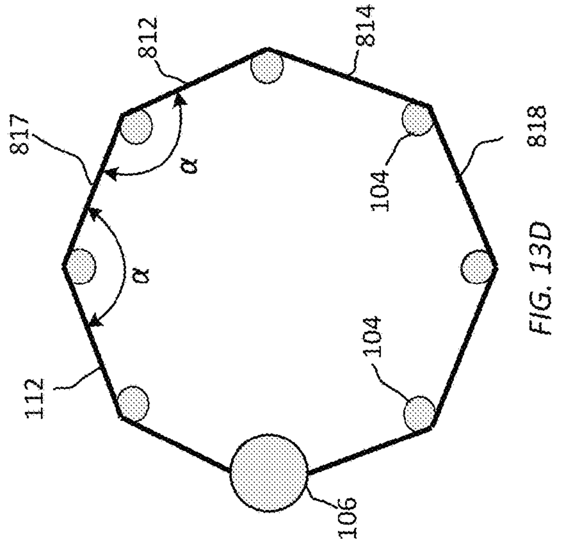
FIGS. 13A-13D are a series of drawings that are useful for understanding a second example of a reflector deployment process.
Figure 13C:
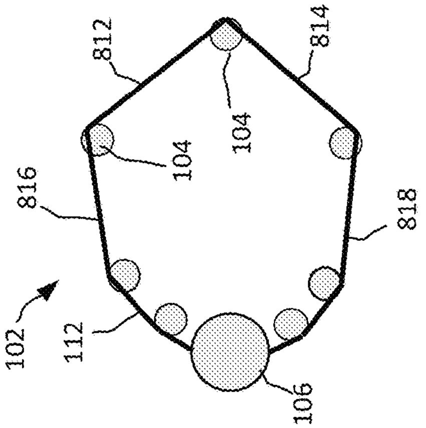
Figure 13B:
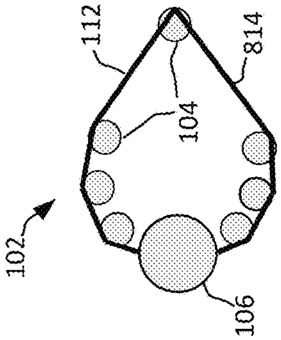
Figure 13A:
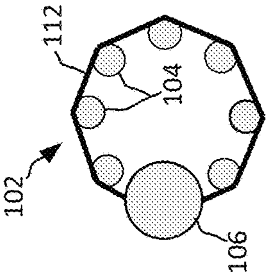

In another scenario illustrated in FIGS. 13A-13D (collectively FIG. 13), the operation of the longerons 112 can be relatively uncontrolled so that the bays or sides do not all necessarily increase at the same time and/or at the same rate during the longeron deployment. In the example shown, it can be observed in FIG. 13B that bays 812, 814 expand first, followed in FIG. 13C by bays 816, 818. The final configuration is shown in FIG. 13D in which it can be observed that an equal interior angle α is established at all of the battens. The growth order shown in FIG. 13 is presented by way of illustration only and it should be understood that the actual order in which particular sides 812, 814, 816, 818 are grown can vary from that which is illustrated in FIG. 13 without limitation. Also, it should be understood that in the scenarios illustrated with respect to FIGS. 12 and 13, a suitable type of detent mechanism can be applied to selectively restrict deployment to a desired sequence.

Figures 14A, 14B, 14C, 14D, 14E, 14F, 14G, 14H, 14I:
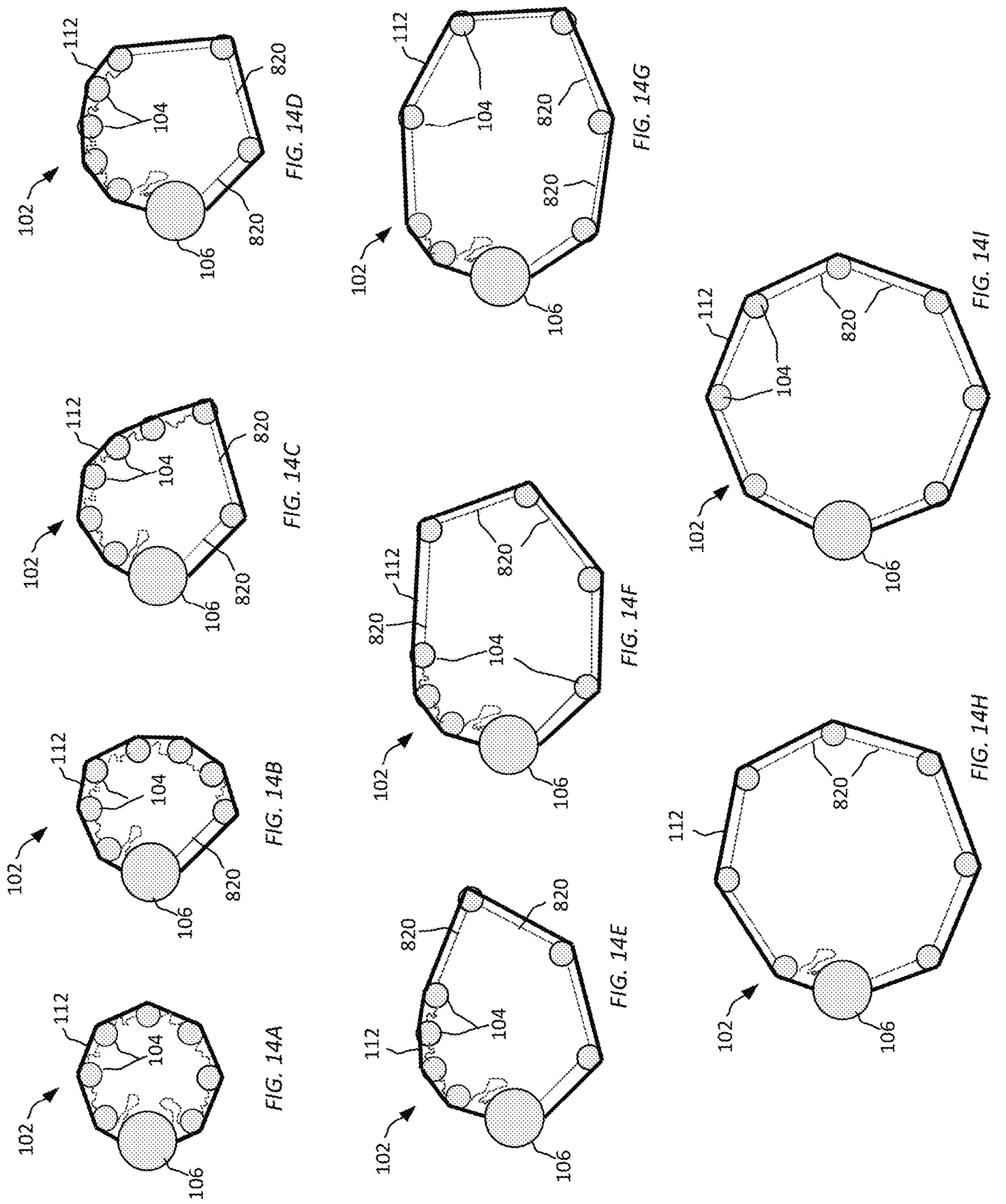
FIGS. 14A-14I are a series of drawings that are useful for understanding a third example of a reflector deployment process.

Various mechanisms can be employed to control an order in which the various sides of the PTA 102 are extended. For example, in one scenario the batten roller 150 and pinch roller 138 associated with different battens 104 can designed so that each presents a different amount of resistance or friction to transverse travel of the longeron through the pinch zone. To facilitate such variations in friction forces, different materials having different coefficients of friction can be selected in some scenarios for the contact surfaces 161, 163, 165 which are associated with each guide member 160. In other scenarios in which a roller (e.g. roller 150) is used at a batten 104, a friction brake shoe 153 can interact with a surface of the roller to apply a drag force. Accordingly, a longeron can be caused to fully (or partially) extend along some sides or bays of the PTA 102 before fully extending along other sides. Structural cross cords, hoop cords, and surface shaping cord net can be used to determine the final spacing of the battens when fully deployed. An example of such a configuration is illustrated in FIGS. 14A-14I (collectively FIG. 14). In FIG. 14, friction or resistance associated with the deployment of the longeron along the length of certain bays can be modified at one or more of the guide members 160 so as to cause the bay nearest to the SEM-DM 106 to deploy first, followed serially by each adjacent bay in a counter-clockwise direction as shown. The maximum deployment of each bay is stopped with a corresponding limit cord 820 provided for each bay.

Figure 15:
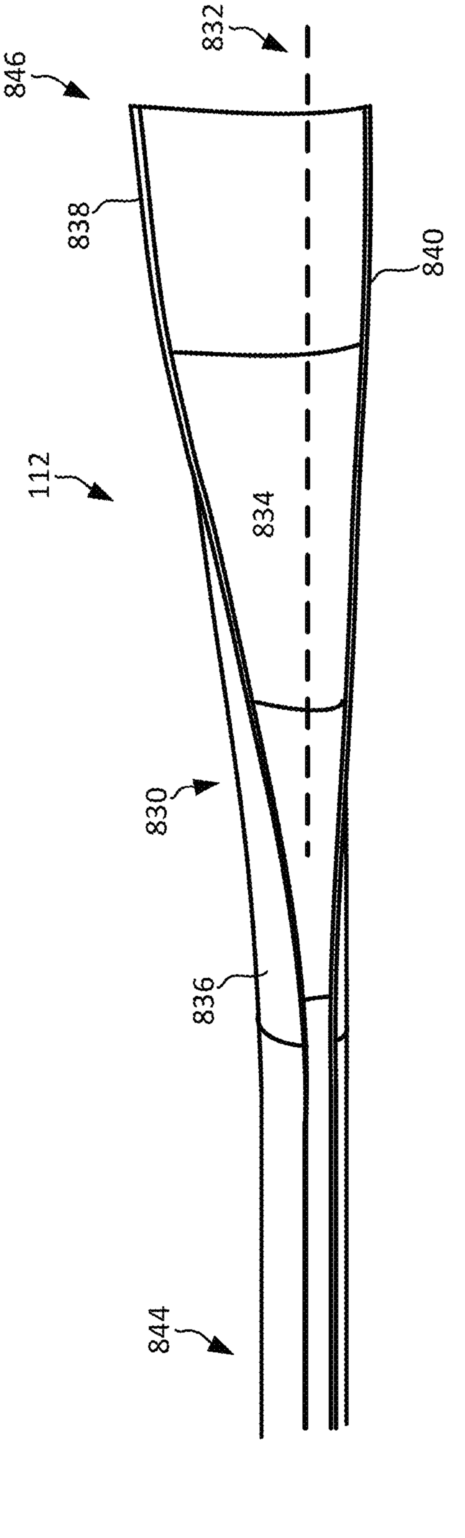
FIG. 15 is a drawing which is useful for understanding certain aspects of an illustrative slit-tube type of SEM.

One example of a STEM used to form the longerons 112 herein can comprise a semi-tubular structure as shown in FIG. 15. The STEM 830 can be disposed about a central longitudinal axis 832. The STEM 830 has opposed internal and external curved surfaces 834, 836 which define an arc disposed between a pair of longitudinal edges 838, 840. The curved surfaces can have an arc length which varies depending upon the degree to which the STEM is in the planate state as compared to the flattened or deployed state. For example, the illustrative STEM in FIG. 15 can have a substantially tubular configuration 844 when in the deployed state in which the opposed internal and external curved surfaces can define a circular arc having an arc length of between about 90 degrees and 360 degrees. When in a planate state 846 the STEM can be substantially or completely planar. Of course, FIG. 15 is just one example of an SEM which can be used to form the longerons in the solution described herein. Many other types of SEM designs are known in the art and any other suitable type of SEM (whether now know or known in the future) can be used to form the longerons 112, without limitation.

The solution is not limited to the scenario described in FIGS. 1-16 in which a longeron extends continuously around the perimeter of the PTA from a single SEM-DM. In other scenarios. For example, FIGS. 17A-17C illustrate a scenario in which the plurality of battens 104 in a reflector 900 can be replaced by a plurality of SEM-DMs 106*a*-106*f*. In such a scenario, the SEM-DMs 106*a*-106*f* can be understood to function as battens at each corner of the reflector. The SEM-DMs 106*a*-106*f* can each have a configuration which is similar to the SEM-DM 106 which is shown in FIG. 7. In such a scenario, each of the SEM-DMs 106*a*-106*f* can respectively stow at least one longeron 112*a*-112*f* for a single bay or side. As in the previous examples, the longerons can be comprised of an SEM. When the reflector 900 is to be deployed, each SEM-DM 106*a*-106*f* can unspool a respective one of the longerons 112*a*-112*f* in respective direction 912*a*-912*b* as shown.

Figure 18:
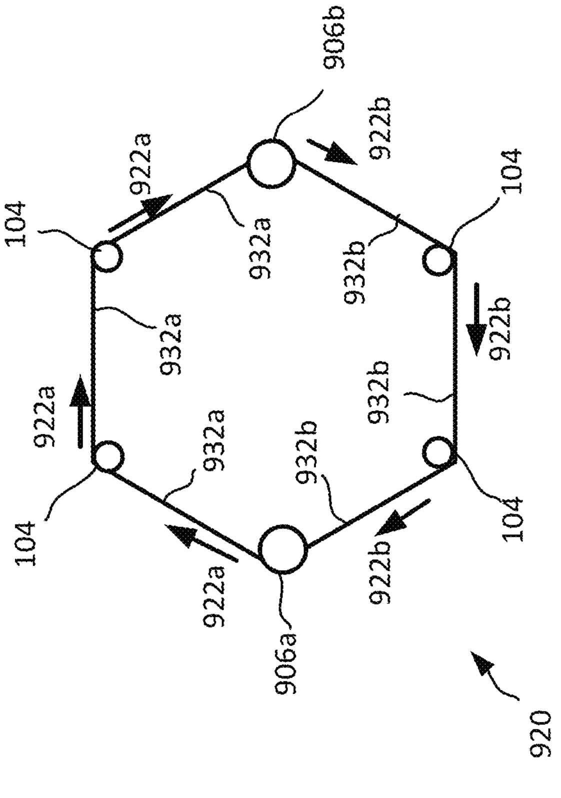
FIG. 18 is a drawing that is useful for understanding a second alternative reflector deployment solution in which a plurality of SEM-DM are provided.

Similarly, other solutions are possible. For example, shown in FIG. 18 is a reflector 920 in which two (2) SEM-DM 906*a*, 906*b* are disposed on opposing corners of the PTA structure. In this example, each SEM-DM 906*a*, 906*b* stows at least one longeron 932*a*, 932*b*. Each of these longerons 932*a* 932*b* is configured so that it will, when unspooled, extend through half of the bays or sides as shown. For example, SEM-DM 906*a* will extend longeron 932*a* along path 922*a* through a first half of the sides or bays forming the reflector, whereas SEM-DM 906*b* will extend longeron 932*b* through path 922*b* through a second half of the bays or sides which form the reflector 920.

Figure 19:
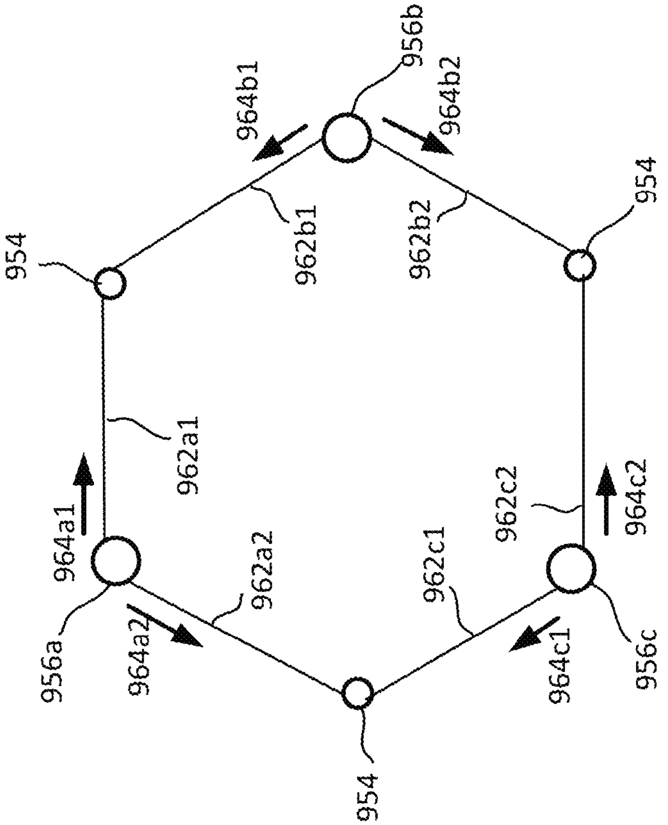
FIG. 19 is a drawing that is useful for understanding a third alternative reflector deployment solution in which a plurality of SEM-DM each unspool SEM longerons in opposing directions.

It's also possible to design an SEM spool that sends out a longeron in more than one direction (e.g., by wrapping the longerons interleaved on top of each other in the spool). In such a scenario a single SEM-DM could unspool the longerons to the bays on either side of the SEM-DM. FIG. 19 illustrates such a configuration in which SEM-DM 956*a* extend longerons 962*a*1, 962*a*2, SEM-DM 956*b* extends longerons 962*b*1, 962*b*2, and SEM-DM 956*c* extends longerons 962*c*1, 962*c*2. More particularly, longerons 962*a*1, 962*a*2 extend respectively in directions 964*a*1, 964*a*2, longerons 962*b*1, 962*b*2 extend respectively in directions 964*b*1, 964*b*2 and longerons 962*c*1, 962*c*2 extend respectively in directions 964*c*1, 964*c*2. Each of the longerons can be securely attached at a tip end (distal from the SEM-DM) to a batten 954 by means of a suitable lug. Such a configuration can eliminate the need for the longerons to be bent around each of the corners comprising the PTA.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for deploying a reflector, comprising:

supporting a collapsible mesh reflector surface with a perimeter truss assembly (PTA) comprised of a plurality of battens and at least one storable extendible member (SEM) longeron extending around a periphery of the PTA to define a hoop;

positioning the battens at distributed locations along an elongated length of the at least one SEM longeron;

bending the at least one SEM longeron around a plurality of truss corners, where each truss corner is respectively defined at one of the plurality of battens;

increasing a deployed length of the at least one SEM longeron extending around at least a portion of a perimeter of the PTA to urge the PTA from a collapsed configuration, in which the battens are closely spaced, to an expanded configuration in which a distance between the battens is increased as compared to the collapsed configuration so as to enlarge an area enclosed by the hoop;

transitioning the collapsible mesh reflector surface from a compactly stowed state when the PTA is in the collapsed configuration to a tensioned state when the PTA is in the expanded configuration;

using at least one friction-reducing member at each of the truss corners to reduce a friction force exerted on the at least one SEM longeron during times when the longeron is moving transversely around the truss corner; and shaping the mesh reflector surface in the tensioned state by using a network of cords supported by the battens to urge the mesh reflector surface to a shape that is configured to concentrate RF energy in a predetermined pattern.

2. The method of claim 1 further comprising forming the SEM longeron from at least one of a slit-tube, a Storable Tubular Extendible Member (STEM), a Triangular Rollable and Collapsible (TRAC) boom, and a Collapsible Tubular Mast (CTM).

3. The method of claim 1, further comprising increasing the deployed length by transitioning the SEM longeron from a spooled condition in which it is flattened and rolled around a spool, to an unspooled condition in which it exhibits beam-like structural characteristics.

4. The method of claim 3, further comprising storing a major portion of the at least one longeron on the spool when the PTA is in the collapsed configuration.

5. The method of claim 1, wherein the deployed length of the at least one SEM longeron is increased in a direction transverse to each of the battens.

6. The method of claim 1, further comprising enforcing an interior angle made by the at least one longeron at each of the battens using at least one guide member.

7. The method of claim 1, further comprising using a pinch structure to flatten the SEM longeron where it bends around each of the plurality of truss corners.

8. The method of claim 1, further comprising supporting the collapsible mesh reflector surface with the plurality of battens at first end portions thereof and supporting a rear network of cords with the plurality of battens at a second end portions thereof, opposed from the first end portions.

9. The method of claim 1, further comprising tensioning a plurality of truss cords between adjacent ones of the plurality of battens responsive to increasing the deployed length of the SEM longerons.

10. The method of claim 9, further comprising using at least one tension cord associated with the at least one SEM longeron configured to synchronize deployment of the plurality of battens.

* * * * *